United States Patent
Dewachter et al.

(10) Patent No.: US 9,376,557 B2
(45) Date of Patent: Jun. 28, 2016

(54) PROCESS FOR PREPARING POLYETHYLENE BLEND COMPRISING METALLOCENE PRODUCED RESINS AND CHROMIUM PRODUCED RESINS

(75) Inventors: Daan Dewachter, Mechelen (BE); Eric Damme, Arquennes (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/003,164

(22) PCT Filed: Mar. 2, 2012

(86) PCT No.: PCT/EP2012/053651
§ 371 (c)(1),
(2), (4) Date: Sep. 4, 2013

(87) PCT Pub. No.: WO2012/119951
PCT Pub. Date: Sep. 13, 2012

(65) Prior Publication Data
US 2013/0345360 A1 Dec. 26, 2013

(30) Foreign Application Priority Data
Mar. 4, 2011 (EP) ..................................... 11157063

(51) Int. Cl.
*C08L 23/06* (2006.01)
*C08L 23/08* (2006.01)
*C08L 23/04* (2006.01)
*C08F 110/02* (2006.01)

(52) U.S. Cl.
CPC ................. *C08L 23/06* (2013.01); *C08L 23/04* (2013.01); *C08L 23/0815* (2013.01); *C08F 110/02* (2013.01); *C08L 2205/025* (2013.01); *C08L 2314/04* (2013.01); *C08L 2314/06* (2013.01)

(58) Field of Classification Search
CPC ................. C08L 23/06; C08L 23/0815; C08L 2205/025; C08L 2314/04; C08L 2314/06; C08F 10/02; C08F 110/02; C08F 210/16

USPC .......................................................... 525/240
See application file for complete search history.

(56) References Cited

U.S. PATENT DOCUMENTS

| 6,864,207 | B2 | 3/2005 | Knoeppel et al. |
| 6,930,071 | B2 | 8/2005 | Knoeppel et al. |
| 2005/0272891 | A1 | 12/2005 | Fouarge et al. |
| 2006/0051538 | A1* | 3/2006 | Maziers ........................ 428/35.7 |
| 2007/0282071 | A1 | 12/2007 | Crowther et al. |
| 2008/0255323 | A1* | 10/2008 | Bodart et al. ................... 526/64 |

FOREIGN PATENT DOCUMENTS

| EP | 952165 A1 * | 10/1999 |
| EP | 0 989 140 A1 | 3/2000 |
| EP | 989141 A1 * | 3/2000 |
| EP | 1 041 096 A1 | 10/2000 |
| EP | 1 319 685 A1 | 6/2003 |
| EP | 1584652 A1 * | 10/2005 |
| EP | 2216367 A1 * | 8/2010 |

OTHER PUBLICATIONS

International Search Report issued in PCT/EP2012/053651 mailed on Mar. 22, 2012 (3 pages).

* cited by examiner

*Primary Examiner* — Roberto Rabago
(74) *Attorney, Agent, or Firm* — Albert Shung

(57) ABSTRACT

A process for preparing a homogeneous polyethylene product can include producing a first polyethylene resin in the presence of a metallocene catalyst in a reactor. The first polyethylene resin can have a density of from 0.942 to 0.970 g/cm$^3$ and an HLMI of from 0.5 to 150 g/10 min. The process can include separately producing a second polyethylene resin in the presence of a chromium catalyst in a reactor. The process can include physically blending together the first polyethylene resin and the second polyethylene resin to produce the homogeneous polyethylene product. The homogeneous polyethylene product can include at least 25% by weight of the first polyethylene resin.

17 Claims, No Drawings

US 9,376,557 B2

PROCESS FOR PREPARING POLYETHYLENE BLEND COMPRISING METALLOCENE PRODUCED RESINS AND CHROMIUM PRODUCED RESINS

CROSS-REFERENCE TO RELATED APPLICATIONS

This applications claims the benefit of PCT/EP2012/053651, filed on Mar. 2, 2012, which claims priority from EP 11157063.6, filed on Mar. 4, 2011.

TECHNICAL FIELD OF THE INVENTION

The present invention relates to a process for preparing a polyethylene product blend comprising metallocene produced resins and chromium produced resins. The invention can advantageously be used in chemical manufacturing, specifically in the polymerization of olefins, particularly ethylene (PE).

BACKGROUND OF THE INVENTION

Polyolefins, such as polyethylene (PE), are synthesized by polymerizing monomers, such as ethylene ($CH_2=CH_2$). Because it is cheap, safe, stable to most environments and easy to be processed polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

After the polymer product is collected from the reactor and the hydrocarbon residues are removed, the polymer product is dried resulting in a polymer resin. Additives can be added and finally the polymer may be mixed and pelletized resulting in polymer product.

During the mixing step, polymer resin and optional additives are mixed intimately in order to obtain a polymer product as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects. Two or more different polyethylene resins can be produced separately and subsequently mixed, representing a physical blending process.

However, complications may occur during preparation of different polyolefin resins into a polyolefin product. In particular, preparation of homogenous mixtures has been found to be difficult and non-homogenous polymer mixtures are not optimal for application in end-products. Consequently, there remains a need in the art for homogeneous polyolefin products produced from polyethylene resin while ensuring low production costs and high-quality end-products.

SUMMARY OF THE INVENTION

Surprisingly, the present inventors have found a way to improve polyethylene preparation processes and overcome at least one of the above and other problems of the prior art. Accordingly, the present invention relates to a process for preparing a polyethylene product, said process comprising the steps of:
  (a) producing a first polyethylene resin in the presence of a metallocene catalyst in a reactor, said first polyethylene resin having a density of from 0.940 to 0.970 $g/cm^3$ and a High Load Melt Index (HLMI) of from 0.5 to 150 g/10 min, with the HLMI being measured by the procedure of ASTM D-1238 using a temperature of 190° C. and a load of 21.6 kg;
  (b) separately producing a second polyethylene resin in the presence of a chromium catalyst in a reactor; and
  (c) physically blending together said first and said second polyethylene resin to produce a polyethylene product.

Preferably, the present invention relates to a process for preparing a polyethylene product, said process comprising the steps of:
  (a) producing a first polyethylene resin in the presence of a metallocene catalyst in a reactor, said first polyethylene resin having a density of from 0.942 to 0.970 $g/cm^3$ and a High Load Melt Index (HLMI) of from 0.5 to 150 g/10 min, with the HLMI being measured by the procedure of ASTM D-1238 using a temperature of 190° C. and a load of 21.6 kg and with the density being determined with the ASTM D-1505 standardized test at a temperature of 23° C.;
  (b) separately producing a second polyethylene resin in the presence of a chromium catalyst in a reactor, and
  (c) physically blending together said first and said second polyethylene resin to produce a polyethylene product,
wherein the polyethylene product comprises at least 25% by weight of the first polyethylene resin.

Surprisingly, the present inventors have found that by carefully selecting polyethylene resins derived from different catalysts, chemically stable and homogeneous polyethylene products may be obtained through physically blending. In fact, chemically non-compatible catalyst combinations can surprisingly be combined in physical blends according to the invention. Surprisingly, the present invention leads to better controlled process conditions, homogeneous polyethylene products and/or more optimal end-products. The polyethylene products of the invention can advantageously be used in various applications.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to physical blending of at least two different polyethylene resins produced with different catalyst into a polyethylene product. Both resins are produced separately preferably in separate reactors, preferably in separate loop reactors, which are preferably single loop reactors.

For the purpose of this invention, "fluff" is defined as the polymer material that is produced in the loop reactor with the hard catalyst particle at the core of each grain of the powder. As used herein the term "resin" encompasses both the fluff produced in the loop reactor as well as the subsequently melted and/or pelleted polyethylene. For the purpose of the invention, "polyethylene product" or "polyethylene pellet" is defined as ethylene polymer material that is produced through compounding and homogenizing of the resin, for instance with mixing and/or extruder equipment.

Surprisingly, the present inventors have found that a metallocene derived polyethylene resin with a density of from 0.940 to 0.970 g/cm$^3$, preferably of from 0.942 to 0.970 g/cm$^3$, and a High Load Melt Index (HLMI) of from 0.5 to 150 g/10 min can be physically blended with a chromium derived polyethylene. The homogeneous polyethylene product may subsequently advantageously be used in various applications.

Preferably, the first polyethylene resin is produced in the presence of a metallocene catalyst in a reactor. Preferably, the first polyethylene resin has a density of from 0.940 to 0.970 g/cm$^3$. More preferably, the first polyethylene resin has a density of from 0.942 to 0.970 g/cm$^3$. Preferably, the first polyethylene resin has a Low Molecular Weight (LMW) and more preferably with a HLMI of from 0.5 to 150 g/10 min. In an embodiment, the first polyethylene resin has a monomodal molecular weight distribution. In another embodiment, the first polyethylene resin has a bimodal molecular weight distribution.

Preferably, the second polyethylene resin is produced in the presence of a chromium catalyst in a reactor. In an embodiment, the second polyethylene resin has a density equal or lower than said first polyethylene resin and more preferably of from 0.920 to 0.960 g/cm$^3$. Preferably, the second polyethylene has a HLMI of between 0.5 and 150 g/10 min, most preferably between 1 and 50 g/10 min. Preferably, the second polyethylene has monomodal molecular weight distribution.

By the term "monomodal polymers" or "polymers with a monomodal molecular weight distribution" it is meant, polymers having one maximum in their molecular weight distribution curve defined also as unimodal distribution curve. By the term "polymers with a bimodal molecular weight distribution" or "bimodal polymers" it is meant, polymers having a distribution curve being the sum of two unimodal molecular weight distribution curves. By the term "polymers with a multimodal molecular weight distribution" or "multimodal" polymers it is meant polymers with a distribution curve being the sum of at least two, preferably more than two unimodal distribution curves. By the term "monomodal polyethylene" or "polyethylene with a monomodal molecular weight distribution" it is meant, polyethylene having one maxima in their molecular weight distribution curve defined also as unimodal distribution curve. By the term "polyethylene with a multimodal molecular weight distribution" or "multimodal" polyethylene product it is meant polyethylene with a distribution curve being the sum of at least two, preferably more than two unimodal distribution curves.

Preferably, the at least two polyethylene resins are physically blended into a polyethylene product. Preferably, the polyethylene product of the invention has a density of from 0.920 to 0.960 g/cm$^3$. Preferably, the polyethylene product of the invention has an HLMI of from 2 to 300 g/10 min. In an embodiment, the polyethylene product has a monomodal molecular weight distribution. In another embodiment, the polyethylene product has a multimodal molecular weight distribution.

According to the invention, the HLMI is determined with the ASTM D-1238 standardized test which uses a temperature of 190° C. and a load of 21.6 kg. The density is determined with the ASTM D-1505 standardized test at a temperature of 23° C.

Preferably, the weight ratio of said first polyethylene resin to said second polyethylene resin in said polyethylene product is between 0.20 and 5. Preferably, the polyethylene product comprises at least 10%, more preferably, at least 25%, most preferably at least 40% and at most 90%, more preferably at most 75%, most preferably at most 60% by weight of the first polyethylene resin, based on the total weight of the polyethylene product. Preferably, the polyethylene product comprises at least 10%, more preferably, at least 25%, most preferably at least 40% and at most 90%, more preferably at most 75%, most preferably at most 60% by weight of the second polyethylene resin, based on the total weight of the polyethylene product. Preferably, the multimodal polyethylene product comprises at least 25%, most preferably at least 40% and at most 90%, more preferably at most 75%, most preferably at most 60% by weight of the first polyethylene resin, and at least 10%, more preferably, at least 25%, most preferably at least 40% and at most 90%, more preferably at most 75%, most preferably at most 60% by weight of the second polyethylene resin, based on the total weight of the polyethylene product.

Preferably, the two polyethylene resins are physically blended into a device for melting and blending said resins selected from a mixer, an extruder or combinations thereof. For example said device is an extruder and/or mixer. Preferably, the device is an extruder. A preferred extruder is a co-rotating twin screw. A preferred mixer is a counter-rotating twin screw. The two polyethylene resins may physically blended in a device for continuously melting and blending the first and second polyethylene resins.

The present invention encompasses a step for preparing polyethylene resin. Polyethylene resins are preferably prepared, in a reactor, either in gas phase or in slurry condition. Preferably, said polyethylene is prepared in slurry conditions. More preferably said polyethylene is produced in a loop reactor that preferably comprises interconnected pipes, defining a reactor path, and wherein a slurry is preferably pumped through said loop reactor. Preferably, each of the polyethylene resins is separately produced in a single loop reactor. In an embodiment, each the polyethylene resins may be produced in a double loop reactor, comprising two loop reactors connected in series.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI) or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred. Exemplary of the alkylene groups is methylidene, ethylidene and propylidene.

Preferred metallocene catalysts for the production of the first polyethylene resin are selected from bis tetrahydroindenyl compounds of the general formula $(IndH4)2R^4MQ_2$ wherein each Ind is the same or different and is indenyl or substituted indenyl, $R^4$ is a bridge which comprises a C1-20 alkylene group, a dialkyl germanium or silicon or siloxane, or an alkyl phosphine or amine group, which bridge is substituted or unsubstituted, M is a Group IVB transition metal or vanadium and each Q is hydrocarbyl having 1 to 20 carbon atoms or halogen.

Illustrative examples of metallocene catalysts comprise but are not limited to bis(cyclopentadienyl) zirconium dichloride ($Cp_2ZrCl_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "chromium catalysts" refers to catalysts obtained by deposition of chromium oxide on a support, e.g. a silica or aluminium support. Illustrative examples of chromium catalysts comprise but are not limited to CrSiO$_2$ or CrAl$_2$O$_3$.

The catalyst is preferably added to the loop reactor as a catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula AlR$^{11}$R$^{12}$R$^{13}$ or AlR$^{11}$R$^{12}$Y, wherein R$^{11}$, R$^{12}$, R$^{13}$ is an alkyl having from 1 to 6 carbon atoms and R$^{11}$, R$^{12}$, R$^{13}$ may be the same or different and wherein Y is hydrogen or a halogen, as disclosed in U.S. Pat. Nos. 6,930,071 and 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200ppm, more preferably from 10 to 100 parts per million, most preferably from 20-70 ppm and for instance around 50 ppm.

As used herein, the term "monomer" refers to olefin compound that is to be polymerized.

Examples of olefin monomers are ethylene and propylene. Preferably, the invention is directed to ethylene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a catalyst, the co-monomer 1-hexene are used.

The polymerization can be performed over a wide temperature range. Preferably, the temperature is within the range of about 0° C. to about 110° C. A more preferred range is from about 60° C. to about 100° C., more preferably from about 80 to 110° C., The reactor pressure is preferably held between 20 and 100 bar, 30 to 50 bar, more preferably at pressure of 37 to 45 bar. In an embodiment, the slurry flow can be set between 5 and 15 m/s.

The pelleted polyethylene product of the invention can be easily produced under flexible processing conditions by using the pelleted first polyethylene product, while leading to homogeneous pelleted polyethylene product. The process provides advantages such as ease of processing.

The following non-limiting example illustrates the invention.

EXAMPLE

A polyethylene resin were produced by physically melting and blending together 33% by weight of a first polyethylene fluff having a monomodal molecular weight distribution having a density of 0.942 Kg/l and 67% by weight of a second polyethylene fluff having a monomodal molecular weight distribution.

The first polyethylene fluff was produced in a single loop reactor in the presence of a metallocene catalyst. The second polyethylene fluff was produced in a single loop reactor in the presence of a chromium catalyst. The characteristics of the produced fluffs are listed in Table 1.

TABLE 1

| Characteristics | First PE fluff | Second PE fluff |
| --- | --- | --- |
| Catalyst used | Metallocene | Chromium |
| HLMI g/10 min | 5 | 8 |
| Density fluff Kg/l | 0.942 | 0.954 |

HLMI was measured by the procedure of ASTM D-1238 using a temperature of 190° C. and a load of 21.6 kg.

The extrusion of the blend was performed in Total Petrochemicals Antwerp. The characteristics and properties of the blend are listed in Table 2. The characteristics and properties of comparative examples are also listed in Table 2.

TABLE 2

| Characteristics | Blend | Comparative example monomodal chromium polyethylene resin |
| --- | --- | --- |
| HLMI g/10 min | 7 | 7 |
| Density fluff Kg/l | 0.950 | 0.950 |
| Stress cracking (ISO 16770, specimen D, 23° C., 11.44 MPa, 2% Igepal) FNCT | 33 | 27 |

As shown in Table 2, the blends according to the invention have a higher stress crack resistance than monomodal polyethylene resins produced in the presence of chromium catalyst.

The invention claimed is:

1. A process for preparing a polyethylene product, said process comprising:
   (a) producing a first polyethylene resin in the presence of a metallocene catalyst in a reactor, said first polyethylene resin having a density of from 0.942 to 0.970 g/cm$^3$ and a High Load Melt Index (HLMI) of from 0.5 to 150 g/10 min, with the HLMI being measured by the procedure of ASTM D-1238 using a temperature of 190° C. and a load of 21.6 kg and with the density being determined with the ASTM D-1505 standardized test at a temperature of 23° C., wherein said first polyethylene resin has a bimodal molecular weight distribution;
   (b) separately producing a second polyethylene resin in the presence of a chromium catalyst in the reactor, and
   (c) physically blending together said first polyethylene resin and said second polyethylene resin to produce a polyethylene product;
   wherein the polyethylene product comprises at least 33% by weight of the first polyethylene resin.

2. The process according to claim 1, wherein the metallocene catalyst used for the production of the first polyethylene resin comprises a bis tetrahydroindenyl compound of the general formula (IndH4)2R$^4$MQ$_2$ wherein each Ind is the same or different and is indenyl or substituted indenyl, R$^4$ is a bridge which comprises a C$_{1-20}$ alkylene group, a dialkyl germanium or silicon or siloxane, or an alkyl phosphine or amine group, which bridge is substituted or unsubstituted, M is a Group IVB transition metal or vanadium and each Q is hydrocarbyl having 1 to 20 carbon atoms or halogen.

3. The process according to claim 1, wherein the second polyethylene resin has an HLMI of between 0.5 and 150 g/10 min.

4. The process according to claim 1, wherein the second polyethylene resin has monomodal molecular weight distribution.

5. The process according to claim 1, wherein the second polyethylene resin has a density of from 0.920 to 0.960 g/cm$^3$.

6. The process according to claim 1, wherein said first polyethylene resin and said second polyethylene resin are each produced under slurry conditions.

7. The process according to claim 1, wherein said first polyethylene resin and said second polyethylene resin are each produced in a loop reactor.

8. The process according to claim 1, wherein step (c) is performed in a device for continuously melting and blending said first polyethylene resin and said second polyethylene resin.

9. The process according to claim 8, wherein said device is an extruder, a mixer, or combinations thereof.

10. The process according to claim 1, wherein the second polyethylene resin has a density that is equal to or lower than the density of the first polyethylene resin.

11. A process for preparing a polyethylene product, said process comprising:
    (a) producing a first polyethylene resin in the presence of a metallocene catalyst in a reactor, said first polyethylene resin having a density of from 0.942 to 0.970 g/cm$^3$ and a High Load Melt Index (HLMI) of from 0.5 to 150 g/10 min, with the HLMI being measured by the procedure of ASTM D-1238 using a temperature of 190° C. and a load of 21.6 kg and with the density being determined with the ASTM D-1505 standardized test at a temperature of 23° C., wherein said first polyethylene resin has a bimodal molecular weight distribution;
    (b) separately producing a second polyethylene resin in the presence of a chromium catalyst in a reactor, wherein the second polyethylene resin has a density ranging from 0.920 to 0.960 g/cm$^3$, an HLMI of from 0.5 to 150 g/10 min, and a monomodal molecular weight distribution;
    (c) physically blending together said first polyethylene resin and said second polyethylene resin to produce a homogenous polyethylene product, wherein the homogenous polyethylene product has a density ranging from 0.920 to 0.960 g/cm$^3$, an HLMI of from 2 to 300 g/10 min, and a multimodal molecular weight distribution;
    wherein the homogenous polyethylene product comprises at least 33% by weight of the first polyethylene resin;
    wherein the homogenous polyethylene product exhibits a higher stress crack resistance than the second polyethylene resin, wherein the stress crack resistance is measured by ISO 16770, specimen D, at 23° C., 11.44 MPa, and 2% Igepal, FNCT, and wherein the homogenous polyethylene product has a multimodal molecular weight distribution.

12. The process of claim 11, wherein the homogenous polyethylene product comprises at least 40% by weight of the first polyethylene resin.

13. The process of claim 1, wherein the polyethylene product comprises at least 40% by weight of the first polyethylene resin.

14. The process according to claim 1, wherein the polyethylene product comprises at most 67% by weight of the second polyethylene resin.

15. The process of claim 14, wherein the polyethylene product comprises at most 60% by weight of the second polyethylene resin.

16. The process according to claim 1, wherein the second polyethylene resin has a density ranging from 0.920 to 0.960 g/cm$^3$, an HLMI of from 0.5 to 150 g/10 min, and a monomodal molecular weight distribution;
    wherein the polyethylene product is a homogenous polyethylene product, wherein the homogenous polyethylene product has a density ranging from 0.920 to 0.960 g/cm$^3$, an HLMI of from 2 to 300 g/10 min, and a multimodal molecular weight distribution;
    wherein the homogenous polyethylene product comprises at most 67% by weight of the second polyethylene resin;
    wherein the homogenous polyethylene product exhibits a higher stress crack resistance than the second polyethylene resin, wherein the stress crack resistance is measured by ISO 16770, specimen D, at 23° C., 11.44 MPa, and 2% Igepal, FNCT, and wherein the homogenous polyethylene product has a multimodal molecular weight distribution.

17. The process of claim 16, wherein the polyethylene product comprises at most 60% by weight of the second polyethylene resin.

\* \* \* \* \*